Patented Apr. 13, 1948

2,439,396

UNITED STATES PATENT OFFICE 2,439,396

FIRE-RESISTANT COATING COMPOSITION

Martin Leatherman, Hyattsville, Md.

No Drawing. Original application June 20, 1942, Serial No. 447,871. Divided and this application June 30, 1945, Serial No. 602,649

5 Claims. (Cl. 260—30.6)

(Granted under the act of March 3, 1883, as amended April 30, 1928; 370 O. G. 757)

This application is a division of my co-pending application Serial No. 447,871, filed June 20, 1942, which issued as U. S. Patent No. 2,407,668 on September 17, 1946.

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to fire retarding or fire resistant coatings for fibrous materials, particularly in filamentous form, and is applicable to cotton, rayon, wool, silk and the like.

One constituent of my novel composition may be either polyvinyl chloride or a co-polymer of vinyl acetate and vinyl chloride. To this is added zinc carbonate. It is the interaction of the vinyl polymer with the zinc carbonate which imparts fire resistance to the fibrous materials when coated with my composition. When the coated material is subjected to ignition temperatures, the vinyl polymer decomposes with evolution of hydrochloric acid which, in addition to possessing excellent flame preventing properties, reacts with the zinc carbonate to liberate carbon dioxide and catalytically active zinc oxide. The zinc oxide acts as a dehydration catalyst in the case of cellulosic materials to split the carbohydrate into water and carbon, thus assisting in preventing flaming.

The physical properties, for some purposes, are enhanced by the addition of a suitable proportion of acrylate or methacrylate ester polymers. These impart flexibility and a generally rubber-like appearance, which may be desirable for some uses.

A fourth constituent of my composition may be some form of opaque pigment which while not required as a flameproofing ingredient, may be desirable to screen out light which in some cases acts detrimentally on the vinyl polymer constituent. A fifth constituent is a suitable plasticizer or softener, a preferred form of which is tricresyl phosphate although certain chlorinated diphenyls, dibutyl phthalate, triphenyl phosphate or any other compatible plasticizer or mixture of plasticizers may also be used.

In practicing my invention a preferred method is to dissolve the resinous constituents together with the plasticizer in compatible solvents and suspend the zinc carbonate and pigments in the solution by any suitable dispersion method. The effect obtained is in large measure determined by the proportion of solvent or diluent present.

The following examples of compositions embodying my invention are given by way of illustration but not of limitation.

Example I 10 lbs. of vinyl acetate-vinyl chloride copolymer dissolved in 30 lbs. of acetone. A paste is made by grinding 6 lbs. zinc carbonate, 2.1 lbs. chromium oxide, 1.2 lbs. ferric oxide (Venetian red), 1 lb. lead chromate, ½ lb. zinc naphthenate in 9.3 lbs. mineral spirits and the paste is then blended with the above copolymer dissolved in acetone.

This example is particularly adaptable for use on yarn, etc., as hereinafter mentioned and may be modified by the addition of compatible plasticizers.

Example II 10 lbs. of polyvinyl chloride are dissolved in 30 lbs. of acetone, and the paste of Example I is blended with the solution of polyvinyl chloride.

Example III 10 lbs. of vinyl acetate-vinyl chloride copolymer are dissolved in 30 lbs. of acetone, and to the resulting solution are added 5 to 8 lbs. of a plasticizer consisting of tricresyl phosphate or triphenyl phosphate. The paste of Example I is then blended with the solution of copolymer containing a plasticizer.

Example IV 10 lbs. of polyvinyl chloride are dissolved in 30 lbs. of acetone, and to the resulting solution are added 5 to 8 lbs. of a plasticizer consisting of tricresyl phosphate or triphenyl phosphate. The paste of Example I is then blended with the solution of polyvinyl chloride containing a plasticizer.

As additional ingredients I also employ such fungicides as pentachlorphenol, copper napthenate, cadmium naphthenate, zinc napthenate, zinc pentachlorphenate, halogenated phenyl phenates and the like in amounts approximating 1% of the weight of the fibrous material.

I claim:

1. A fire-resistant composition for treating yarn, comprising the following materials, in substantially the proportions stated: 10 lbs. polyvinyl chloride, 30 lbs. acetone, 6 lbs. zinc carbonate, 2.1 lbs. chromium oxide, 1.2 lbs. Venetian red (ferric oxide), 1 lb. lead chromate, 9.3 lbs. mineral spirits, and ½ lb. zinc naphthenate.

2. A fire-resistant composition for treating yarn, comprising the following materials in substantially the proportions stated: 10 lbs. vinyl chloride-vinyl acetate copolymer, 5 to 8 lbs. of plasticizer from the group consisting of tricresyl phosphate and triphenyl phosphate, 30 lbs. acetone, 6 lbs. zinc carbonate, 2.1 lbs. chromium oxide, 1.2 lbs. Venetian red (ferric oxide), 1 lb. lead chromate, 9.3 lbs. mineral spirits, and ½ lb. zinc naphthenate.

3. A fire-resistant composition for treating yarn, comprising the following materials in substantially the proportions stated: 10 lbs. polyvinyl chloride, 5 to 8 lbs. of plasticizer from the group consisting of tricresyl phosphate and triphenyl phosphate, 30 lbs. acetone, 6 lbs. zinc carbonate, 2.1 lbs. chromium oxide, 1.2 lbs. Venetian red (ferric oxide), 1 lb. lead chromate, 9.3 lbs. mineral spirits, and ½ lb. zinc napththenate.

4. A fire-resistant composition for treating yarn, comprising the following materials in substantially the proportions stated: 10 lbs. vinyl chloride-vinyl acetate copolymer, 30 lbs. acetone, 6 lbs. zinc carbonate, 2.1 lbs. chromium oxide, 1.2 lbs. Venetian red (ferric oxide), 1 lb. lead chromate, 9.3 lbs. mineral spirits and ½ lb. zinc naphthenate.

5. A fire-resistant composition for treating yarn, comprising the following materials in substantially the proportions stated: 10 lbs. of a material from the group consisting of polyvinyl chloride and vinyl chloride-vinyl acetate copolymer, 30 lbs. acetone, 6 lbs. zinc carbonate, 2.1 lbs. chromium oxide, 1.2 lbs. Venetian red (ferric oxide), 1 lb. lead chromate, 9.3 lbs. mineral spirits, and ½ lb. zinc naphthenate.

MARTIN LEATHERMAN.